March 2, 1971  H. KRUGER  3,567,304
BIPARTITE ACHROMATE
Filed Jan. 30, 1969

United States Patent Office
3,567,304
Patented Mar. 2, 1971

3,567,304
BIPARTITE ACHROMATE
Hans Kruger, Neckarsteinach, Germany, assignor to
Eltro GmbH & Co., Heidelberg, Germany
Filed Jan. 30, 1969, Ser. No. 795,254
Claims priority, application Germany, Mar. 13, 1968,
P 12 81 168.6–51
Int. Cl. G02b 3/00, 9/10
U.S. Cl. 350—2  4 Claims

ABSTRACT OF THE DISCLOSURE

A bipartite achromate including a collective lens of barium fluoride and a divergent lens of sapphire or magnesium oxide, the Abbe number of the collective lens being higher than that of the divergent lens and the index of refraction being lower.

The Abbe number is a function of the refraction indices of the optical materials to be used for the individual lenses.

DRAWING

Figure 1:
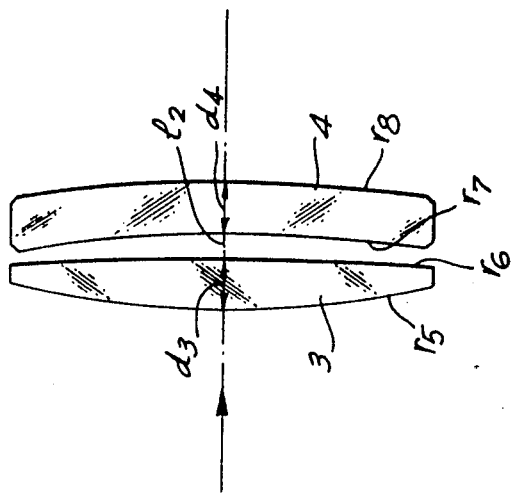

FIG. 1 diagrammatically illustrates one embodiment of the invention; and

Figure 2:
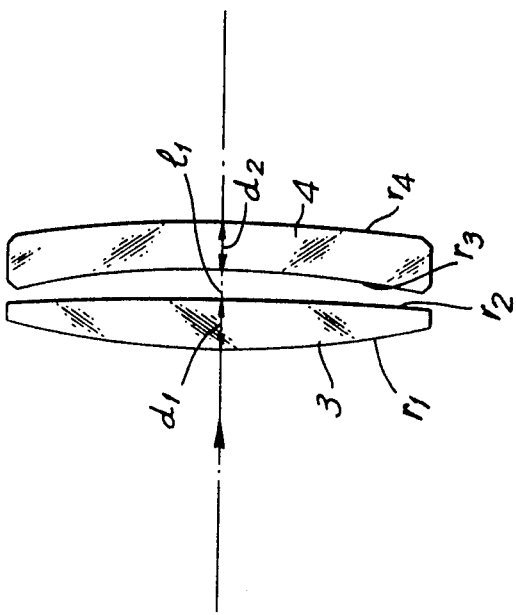

FIG. 2 diagrammatically illustrates a second embodiment of the invention.

DETAILED DESCRIPTION

Optical systems, by means of which achromatization for wavelengths of the infra-red spectral range can be brought about, are already known. Primarily they are characterized by the choice of special infra-red-pervious materials. Silicon-germanium achromates, for example, lend themselves to achromatizing for wavelengths exceeding 1.9 $\mu$m., but are impervious for wavelengths smaller than 1.9 $\mu$m. On the other hand, lithium-fluoride-quartz achromates eliminate chromatic aberration for the range of wavelengths between 0.2 $\mu$m. and 1.6 $\mu$m. However, depending on the type of quartz or quartz-glass, they show undesirable bands of absorption for wavelengths larger than or equal to 2.6 $\mu$m.

For various optical instruments, such as multi-range photometers, image-producing objectives are needed, which should be permeable for the radiation of several different spectral ranges: e.g., for visible radiation and for IR radiation. This raises simultaneously the demand for appropriate correction of the chromatic locating errors inherent to such objectives. The known achromates are not capable of meeting requirements of this kind.

It is an object of the present invention to provide an objective, which is, simultaneously, highly permeable to the radiation of the visible and to the infra-red spectral ranges and is additionally chromatically corrected for an operating range between 3.5 $\mu$m. and 5.5 $\mu$m.

For this purpose, the invention proceeds from the basis of a bipartite achromate, consisting of a frontally arranged collective lens followed by a divergent lens, with an Abbe number for the collective lens and its index of refraction being higher and lower, respectively, than the corresponding values for the divergent lens.

In consideration of the problem posed in accordance with the above, it becomes necessary to define an Abbe number $\nu$ 4.5 $\mu$m. referred to the desired spectral operating range, as follows:

$$\nu 4.5 \mu m. = \frac{n_{4.5 \mu m.} - 1}{n_{3.5 \mu m.} - n_{5.5 \mu m.}}$$

In this formula $n_{3.5 \mu m.}$, $n_{4.5 \mu m.}$, and $n_{5.5 \mu m.}$ designate the refraction indices of the optical materials to be used for the individual lenses for the wavelengths 3.5 $\mu$m., 4.5 $\mu$m. and 5.5 $\mu$m.

In the following table, the values for $\nu$ 4.5 $\mu$m. and for $n_{4.5 \mu m.}$ of various materials, suitable for making anchromates according to the invention, are listed:

| Material | $\nu 4.5 \mu m$ | $n_{4.5 \mu m}$ |
|---|---|---|
| Barium | 39.8 | 1.454 |
| Sapphire | 6.3 | 1.6515 |
| Magnesium oxide | 10.4 | 1.6533 |

Thus, for example achromates can be formed by the following material combinations:

Collective lens from barium fluoride and divergent lens from sapphire, or
Collective lens from barium fluoride and divergent lens from magnesium oxide.

For above material combinations, the ratio of the Abbe number of the collective lens to that of the subsequent divergent lens is approximately 6.3 or 3.8, respectively, whereas the refraction indices of the lenses differ by at least 0.19.

Two examples of embodiments of the invention are represented in the drawing for explanatory purposes. FIG. 1 shows a barium fluoride-sapphire achromate in longitudinal section, and FIG. 2 shows a barium fluoride-magnesium oxide achromate, likewise in longitudinal section. Each achromate includes a collective lens 3 and divergent lens 4.

Both achromates are chromatically corrected for a working range between 3.5 $\mu$m. and 5.5 $\mu$m.

The data of the systems represented in FIGS. 1 and 2 refer in each case to a total focal length of 100 and an opening ratio of 1:10, and are compiled in the Tables I and II.

TABLE I (for Fig. 1)

| Radius of curvature, mm. | Axial thickness or air gap, mm. | Index of refraction $n_{4.5 \mu m}$. | $\nu 4.5 \mu m$. value |
|---|---|---|---|
| $r_1 = +46.9$ | $d_1 = 1.02$ | 1.454 | 39.8 |
| $r_2 = -217.4$ | $l_1 = 1.02$ | | |
| $r_3 = -54.6$ | $d_2 = 1.02$ | 1.6515 | 6.3 |
| $r_4 = -64.2$ | | | |

TABLE II (for Fig. 2)

| Radius of curvature, mm. | Axial thickness or air gap, mm. | Index of refraction $n_{4.5 \mu m}$. | $\nu 4.5 \mu m$. value |
|---|---|---|---|
| $r_5 = +43.4$ | $d_3 = 1.81$ | 1.454 | 39.8 |
| $r_6 = -201.1$ | $l_2 = 1.09$ | | |
| $r_7 = -64.5$ | $d_4 = 1.81$ | 1.6533 | 10.4 |
| $r_8 = -88.5$ | | | |

In the above tables, tolerances of $\pm\frac{1}{1000}$ are acceptable in the radii and of $+0.03f$ to $-0.002f$ for the axial thicknesses and air gaps.

What is claimed is:

1. An optical structure comprising a bipartite achromate permeable to visible and infra-red spectral ranges and chromatically corrected for an operating range between about 3.5 and 5.5 $\mu$m., said bipartite achromate comprising a frontally arranged collective lens and a divergent lens operatively associated with the collective lens and optically following the same, the Abbe number of the collective lens being higher and its index of refraction being lower than the corresponding number and index of the divergent lens, the collective lens being of barium fluoride and the divergent lens of sapphire, and wherein for a total focal length of $f=100$ mm. and an Abbe number defined by the formula:

$$\nu 4.5\mu m. \frac{n_{4.5\mu m}-1}{n_{3.5\mu m}-n_{5.5\mu m}}$$

the lenses are characterized about as follows:

| Radius of curvature, mm. | Axial thickness or air gap, mm. | Index of refraction $n_{4.5 \mu m}$ | $\nu 4.5 \mu m$; value |
|---|---|---|---|
| $r_1=+46.9$ | $d_1=1.02$ | 1.454 | 39.8 |
| $r_2=-217.4$ | $l_1=1.02$ | | |
| $r_3=-54.6$ | $d_2=1.02$ | 1.6515 | 6.3 |
| $r_4=-64.2$ | | | |

2. Bipartite achromate as claimed in claim 1 wherein tolerances of $\pm\frac{1}{1000}$ are acceptable for the radii and of $+0.03f$ to $-0.002f$ for the thicknesses and air gap.

3. An optical structure comprising a bipartite achromate permeable to visible and infra-red spectral ranges and chromatically corrected for an operating range between about 3.5 and 5.5 $\mu$m., said bipartite achromate comprising a frontally arranged collective lens and a divergent lens operatively associated with the collective lens and optically following the same, the Abbe number of the collective lens being higher and its index of refraction being lower than the corresponding number and index of the divergent lens, the collective lens being of barium fluoride and the divergent lens of magnesium oxide, and wherein for a total focal length of $f=100$ mm. and an Abbe number defined by the formula:

$$\nu 4.5\mu m. \frac{n_{4.5\mu m}-1}{n_{3.5\mu m}-n_{5.5\mu m}}$$

the lenses are characterized about as follows:

| Radius of curvature, mm. | Axial thickness or air gap, mm. | Index of refraction $n_{4.5 \mu m}$ | $\nu 4.5 \mu m$ value |
|---|---|---|---|
| $r_5=+43.4$ | $d_3=1.81$ | 1.454 | 39.8 |
| $r_6=-201.1$ | $l_2=1.09$ | | |
| $r_7=-64.5$ | $d_4=1.81$ | 1.6533 | 10.4 |
| $r_8=-88.5$ | | | |

4. Bipartite achromate as claimed in claim 3 wherein tolerances of $\pm\frac{1}{1000}$ are acceptable for the radii and of $+0.03f$ to $-0.002f$ for the thicknesses and air gap.

References Cited

UNITED STATES PATENTS 2,659,271  11/1953  Treuting _____ 350—2

OTHER REFERENCES

R. G. Treuting, "An Achromatic Doublet of Silicon and Germanium," JOSA, vol. 41, #7, July 1951.

Herzberger et al., "Refractive Indices of Infrared Optical Materials & Color Correction of Infrared Lenses," JOSA, vol. 52, #4, April 1962.

DAVID SCHONBERG, Primary Examiner

P. A. SACHER, Assistant Examiner

U.S. Cl. X.R.

350—232